United States Patent
Kong

(10) Patent No.: US 10,010,143 B2
(45) Date of Patent: Jul. 3, 2018

(54) UMBRELLA WITH A BLUETOOTH SOUND DEVICE

(71) Applicant: Zhejiang Dingsheng Outdoor Living Products Co., Ltd., Taizhou (CN)

(72) Inventor: Chengxi Kong, Taizhou (TW)

(73) Assignee: Zhejiang Dingsheng Outdoor Living Products Co., Ltd., Taizhou (CN)

( * ) Notice: Subject to any disclaimer, the term of this patent is extended or adjusted under 35 U.S.C. 154(b) by 0 days.

(21) Appl. No.: 15/672,914

(22) Filed: Aug. 9, 2017

(65) Prior Publication Data

US 2018/0042346 A1    Feb. 15, 2018

(30) Foreign Application Priority Data

Aug. 12, 2016  (CN) .................. 2016 2 0875276 U

(51) Int. Cl.
| | | |
|---|---|---|
| *A45B 3/04* | (2006.01) | |
| *A45B 23/00* | (2006.01) | |
| *H04B 1/08* | (2006.01) | |

(52) U.S. Cl.
CPC .............. *A45B 3/04* (2013.01); *H04B 1/08* (2013.01); *A45B 2023/005* (2013.01); *A45B 2023/0037* (2013.01); *A45B 2200/1027* (2013.01); *H04R 2420/07* (2013.01)

(58) Field of Classification Search
None
See application file for complete search history.

(56) References Cited

U.S. PATENT DOCUMENTS

| | | | | |
|---|---|---|---|---|
| 5,273,062 A * | 12/1993 | Mozdzanowski | ........ | A45B 3/00 135/16 |
| 8,104,491 B2 * | 1/2012 | Li | .......... | A45B 23/00 135/16 |
| 8,345,889 B2 * | 1/2013 | Li | .......... | A47B 37/04 381/77 |
| 8,393,341 B2 * | 3/2013 | Li | .......... | F21V 21/34 135/16 |
| 8,453,659 B2 * | 6/2013 | Li | .......... | A45B 3/00 135/16 |
| 9,006,940 B2 * | 4/2015 | Korman | ................ | H01L 31/042 307/149 |
| 9,125,462 B2 * | 9/2015 | Akin | ....... | A45B 25/00 |
| 9,185,988 B1 * | 11/2015 | Sanchez | ................. | A47C 7/66 |
| 9,289,039 B2 * | 3/2016 | Akin | ....... | A45B 25/00 |
| 9,369,559 B1 * | 6/2016 | Leventhal | ........... | H04M 1/6041 |

(Continued)

*Primary Examiner* — Noah Chandler Hawk
(74) *Attorney, Agent, or Firm* — Wang Law Firm, Inc.

(57) ABSTRACT

An umbrella with a Bluetooth sound device, which includes a column having a top and a middle, a tray, a plurality of ribs, a canopy, a controlling handle disposed on the middle of the column and an electrical box having a involutory front cover and back cover. A solar receiving device is connected to the top of the column; a plurality of LED lamp strings is attached to the tray and the ribs. The PCB circuit board, the speaker, the LED lamp strings, the solar rechargeable cell and the umbrella are reasonably combined and fused into an entirety, thereby being very convenient to detach and install at the same time and convenient to change and maintain parts, the umbrella not only satisfies the daily sunshade and rain shielding of outdoor leisure facilities, but also has illumination, music playing, call answering and other functions, and is convenient to operate.

11 Claims, 9 Drawing Sheets

(56) References Cited

U.S. PATENT DOCUMENTS

| | | | |
|---|---|---|---|
| 9,510,653 B2* | 12/2016 | Akin | A45B 25/00 |
| 2005/0161067 A1* | 7/2005 | Hollins | A45B 23/00 |
| | | | 135/16 |
| 2006/0005869 A1* | 1/2006 | Kuelbs | A45B 3/00 |
| | | | 135/20.3 |
| 2016/0326765 A1* | 11/2016 | Barbret | E04H 15/02 |
| 2016/0340926 A1* | 11/2016 | Barbret | E04H 15/28 |

* cited by examiner

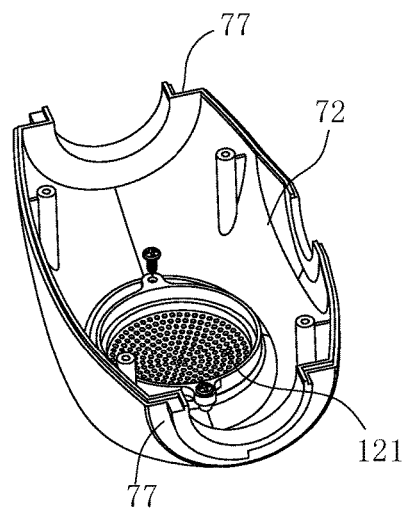
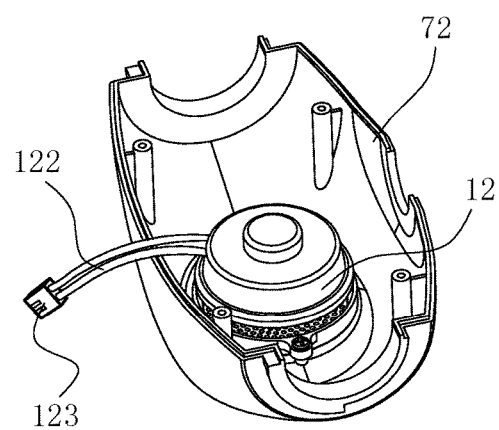
FIG. 6
FIG. 7
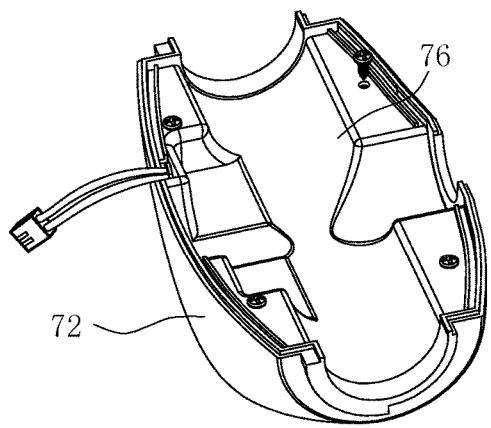
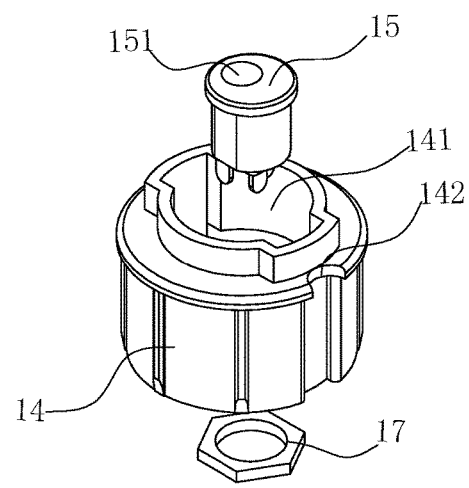
FIG. 8
FIG. 9

UMBRELLA WITH A BLUETOOTH SOUND DEVICE

TECHNICAL FIELD OF THE INVENTION

The present invention belongs to the technical field of outdoor umbrellas, and specifically relates to an umbrella with a Bluetooth sound device.

BACKGROUND OF THE INVENTION

An umbrella is a standing tool for shading in existing squares, gardens, beaches or lawns and other leisure facilities, and provides a comfortable cool space for outdoor activities.

However, the existing umbrella has an obvious shortcoming, that is, when people need sound and illumination during outdoor leisure, they must carry additional sound and illumination devices and place the same in the umbrella for use. As the sound and illumination devices have large volumes and need to be connected with external power supplies, they are very inconvenient to use, and the sound effect is not ideal.

According to investigations, the Chinese patent "Umbrella with Sound Device" with a patent number of 200820136724.9 is available at present, the umbrella comprises a column, a tray, a plurality of ribs, a canopy, a controlling handle and a transmission device, wherein the plurality of ribs are connected to the top of the column through the tray, the canopy is disposed on the plurality of ribs, the controlling handle drives the canopy to unfold or fold through the transmission device, wherein a solar receiver is disposed at the top end of the column, LED lamp strings are disposed on the tray and the plurality of ribs, an electrical box is disposed on the column, an audio power amplifier, a speaker, a frequency modulation receiver, an electronic control module and a nickel-metal hydride battery are disposed in the electrical box. This umbrella has power amplification, radio reception, illumination and other functions, so that people can enjoy comfortable music and illumination in outdoor activities, but the umbrella only has the power amplification and radio reception functions, and does not have a Bluetooth function, thereby being unable to answer calls, a frequency modulation receiver needs to be deployed, audio signals need to be transmitted by an external MP3 player, and thus the structure of this mode is relatively complex.

Also, the Chinese patent "Umbrella with Bluetooth Sound Box" with a patent number of CN201420298019.4 comprises a column, an upper tray, a lower tray, long a plurality of ribs, short a plurality of ribs and a canopy, wherein a solar rechargeable cell is installed at the top of the umbrella, the solar rechargeable cell is exposed from the canopy, and a Bluetooth sound box electrically connected with the solar rechargeable cell and powered by the solar rechargeable cell is installed at the bottom of the lower tray. The Bluetooth sound box powered by the solar rechargeable cell is installed at the bottom of the lower tray of the umbrella, thereby expanding the entertainment function of the umbrella. But as the Bluetooth sound box is installed at the bottom of the lower tray, the Bluetooth sound box moves up and down along with the lower tray when the plurality of ribs are unfolded or folded, thereby being not only easy to be damaged, the connecting wire between the Bluetooth sound box and the solar rechargeable cell is liable to wear, and thus the structure needs to be further improved.

SUMMARY OF THE INVENTION

A technical problem to be solved by the present invention is to provide an umbrella with a Bluetooth sound device, which is reasonable in structure, more abundant in functions and convenient to carry in view of the above technical status. The umbrella can not only satisfy daily sunshade and rain shielding of outdoor leisure facilities, but also can bring more interests to the outdoor leisure of people.

To solve the technical problem mentioned above, the umbrella with a Bluetooth sound device comprises a column having a top and a middle; a tray slidably mounted on the column; a plurality of ribs, which are connected to the top of the column through the tray; a canopy covering the ribs; a controlling handle disposed on the middle of the column for operating the plurality of ribs; a solar receiving device connected to the top of the column; a plurality of LED lamp strings attached to the tray and the ribs; an electrical box, attached on the column, with an upper end and a lower end; wherein, an audio power amplifier, a speaker, an electronic control module, a Bluetooth module and a microphone circuit are disposed inside the electrical box; the Bluetooth module connecting wirelessly with a mobile terminal for transmitting audio signals and answering calls of the mobile terminal; the audio power amplifier having an output connected to the speaker; the Bluetooth module having an output connected to an input of the audio power amplifier, the Bluetooth module is connected to the microphone circuit; and the electronic control module is connected to and controls the audio power amplifier, the Bluetooth module, and the LED lamp strings.

Preferably, the electrical box comprises a front cover having an inner cover and a back cover having an inner cover, the front cover and the back cover are involuted and snaps onto each other; an upper rotation snap ring and a lower rotation snap ring are respectively attached to the upper and lower ends of the electrical box; the electrical box is attached to the middle of the column through the upper rotation snap ring and the lower rotation snap ring and is sheathed at the outside of the controlling handle.

Preferably, an indicator lamp lampshade, a power switch and a thin film switch are disposed on an outer end surface of the front cover; the electronic control module with the Bluetooth module is disposed in the front cover, the electronic control module is disposed on a PCB circuit board; a speaker is installed inside the back cover; the PCB circuit board has a speaker interface connected with the speaker, a connector interface connected with the thin film switch, a wires interface connected to lamp string connecting wires, a solar cell connecting wire and a negative electrode connecting wire; two inner covers are respectively disposed inside the front cover and the back cover, and a circular hole for the column to pass through is formed between the inner covers after the front cover and the back cover snapped together.

Preferably, locating grooves for accommodating the indicator lamp lampshade and the thin film switch are formed in an outer surface of the front cover; the indicator lamp lampshade is fixed to a corresponding position on the outer surface of the front cover through screws; the power switch is installed inside a switch hole of the indicator lamp lampshade; a switch spring propping against the power switch is disposed inside the front cover; the PCB circuit board is fixed to an inner side of the front cover through screws; a spring seat is disposed at a position corresponding to that of the power switch on the PCB circuit board so as to support the switch spring.

Preferably, the thin film switch comprises a lamp string on/off key, a Bluetooth switch, a volume increase key/continuous volume increase key, a last song key, a next song key and a volume decrease key/continuous volume decrease key; the lamp string on/off key is in a four-segment mode, when the lamp string on/off key is pressed for once, a light control circuit is turned on, and the LED lamp strings on the plurality of ribs emit light; when the lamp string on/off key is pressed for twice, the LED lamp strings on the tray emit light; when the lamp string on/off key is pressed for three times, the LED lamp strings on the plurality of ribs and the LED lamp strings on the tray emit light at the same time; when the lamp string on/off key is pressed for four times, the LED lamp strings on the plurality of ribs and the LED lamp strings are turned off at the same time; the thin film switch is adhered on a corresponding position on the outer surface of the front cover by adhesive sticker; key leads of the thin film switch are connected with the corresponding interfaces on the PCB circuit board via through holes on the locating grooves.

Preferably, a speaker cover for locating the speaker is detachably disposed on the back cover; the speaker is disposed inside the speaker cover; a speaker lead is welded on the speaker; an end of the speaker lead is inserted into the speaker interface on the PCB circuit board through a lead plug.

Preferably, the inner covers of the front cover and the back cover are respectively fixed inside the front cover and the back cover through screws; a notch for exposing the speaker interface on the PCB circuit board and the wires interface connecting the LED lamp strings, a solar rechargeable cell and a negative electrode is formed in the inner cover of the front cover; a notch for penetrating through the speaker lead is formed in the inner cover of the back cover.

Preferably, a cap plug is inserted into the opening at the top end of the column; a DC socket is inserted into the cap plug; a DC plug inserted with the DC socket is installed on the solar receiving device; an upper end of the DC socket is inserted into the DC plug, and a lower end of the DC socket is connected with the lamp string connecting wires, the solar cell connecting wire and the negative electrode connecting wire.

Preferably, a locating hole for locating the solar receiving device is formed in the cap plug; a center hole for inserting the DC socket is formed in the locating hole; the DC socket is inserted into the center hole by penetrating through the locating hole and is fixed by a fixing screw cap; a jack for inserting the DC plug is formed in the upper end of the DC socket; two pins are disposed on the lower end of the DC socket, the first pin is connected with the negative electrode connecting wire and the lamp string connecting wires, and the second pin is connected with the solar cell connecting wire.

Preferably, the lamp string connecting wires comprise two paths for the rib lamp strings and the tray lamp strings; a first wire pass hole for inserting the two paths of lamp string connecting wires into the inner hole of the column is formed in the side of the cap plug; a second wire pass hole for enabling the ends of the negative electrode connecting wire, the two paths of lamp string connecting wires and the solar cell connecting wire to penetrate through is formed in a position corresponding to the installation position of the electrical box on the side of the middle of the column; the ends of the negative electrode connecting wire, the two paths of lamp string connecting wires and the solar cell connecting wire are gathered on a total lead plug after penetrating through the column and are connected to the corresponding wires interface on the PCB circuit board in the electrical box through the total lead plug.

Preferably, the solar receiving device comprises a solar photovoltaic cell panel, a solar rechargeable cell, a cell installation box and a cell circuit board; the solar rechargeable cell is disposed inside the cell installation box, red conducting wires of the solar photovoltaic cell panel and the solar rechargeable cell are respectively welded on a positive electrode bonding pad of the cell circuit board, while black conducting wires of the solar photovoltaic cell panel and the solar rechargeable cell are respectively welded on a negative electrode bonding pad of the cell circuit board; the cell installation box is composed of a box body and a base, which are involutory; the solar photovoltaic cell panel is disposed on the surface of the cell installation box; a charging circuit is formed through the cell circuit board and the solar rechargeable cell; a locating block matched with the locating hole of the cap plug for insertion is convexly disposed at the middle of the lower end of the base; an installation hole for inserting and fixing the DC plug is formed inside the locating block; the DC plug is disposed inside the installation hole; the red conducting wire at the upper end of the DC plug is welded on the positive electrode bonding pad of the cell circuit board, while the black conducting wire at the upper end of the DC plug is welded on the negative electrode bonding pad of the cell circuit board.

Finally, an accommodation groove for accommodating the solar rechargeable cell is formed inside the cell installation box; a positive plate and a negative plate are respectively disposed on both ends of an inner wall of the accommodation groove; plastic cement is coated on the outer surface of the DC plug; the upper end of the DC plug is inserted into the installation hole, and the lower end of the DC plug is inserted with the DC socket through the collaboration between the locating block and the locating hole.

Compared with the prior art, the present invention has the following advantages: the electronic control module with the Bluetooth module is disposed on the PCB circuit board in the electrical box and is in wireless connection with the mobile terminal through the Bluetooth module for playing music or answering calls; the electrical box is composed of the front cover and the back cover, which are involutory and are detachable, and the inner covers are disposed inside the front cover and the back cover for protecting the PCB circuit board and the speaker and the like; as the solar receiving device is disposed at the top of the umbrella, no external power supply is needed, thereby being green and environment friendly, safe and reliable, and convenient to detach, change and maintain; the solar receiving device is inserted with the DC socket at the top of the column through the DC plug, thereby being very convenient to connect and detach. The present invention has a reasonable structure, the PCB circuit board, the speaker, the LED lamp strings, the solar receiving device and the umbrella are reasonably combined and fused into an entirety, thereby being very convenient to detach and install at the same time and convenient to change and maintain parts, the umbrella not only satisfies the daily sunshade and rain shielding of outdoor leisure facilities, but also has illumination, music playing, call answering and other functions, and is convenient to operate, therefore the functions of the umbrella are greatly increased, and more interests are brought to the outdoor leisure of people.

BRIEF DESCRIPTION OF THE DRAWINGS

FIG. 6 is a perspective view of a back cover of the electrical box when a speaker cover is installed;

FIG. 7 is a perspective view of the back cover of the electrical box when a speaker is installed;

FIG. 8 is perspective view of the back cover of the electrical box when the inner cover is disposed inside;

FIG. 9 is an installation structure diagram of a cap plug and a DC socket;

DETAILED DESCRIPTION OF THE INVENTION

Figure 1:
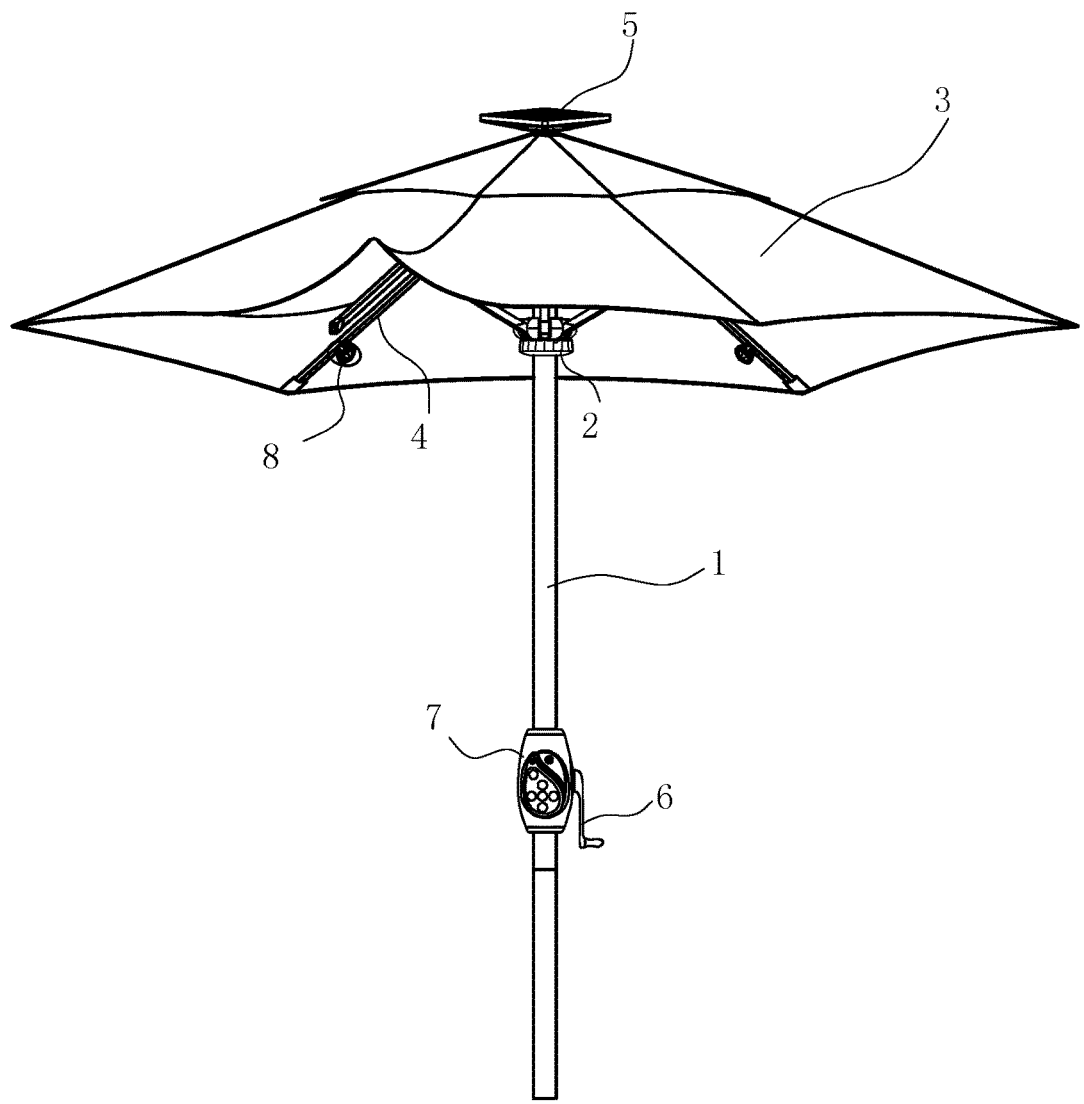
FIG. 1 is a perspective view of an umbrella with a Bluetooth sound device according to an embodiment of the present invention.
Figure 2:
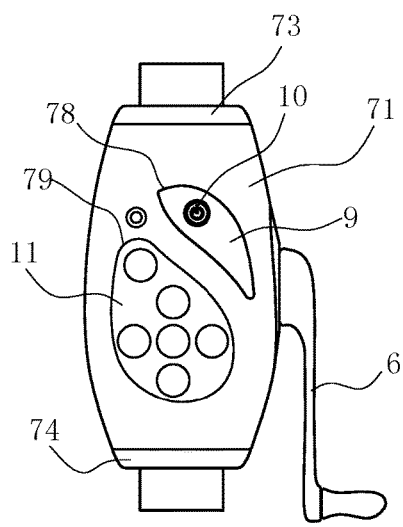
FIG. 2 is a front view of an electrical box in FIG. 1.
Figure 3:
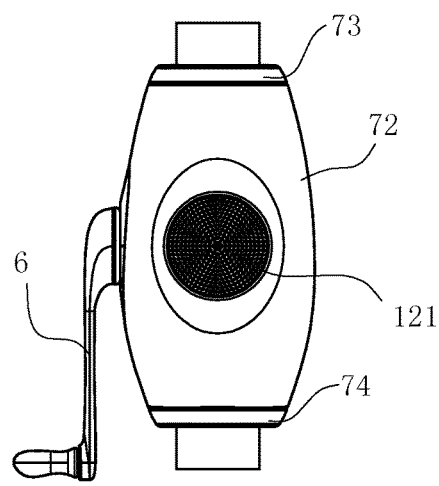
FIG. 3 is a rear view of the electrical box.
Figure 4:
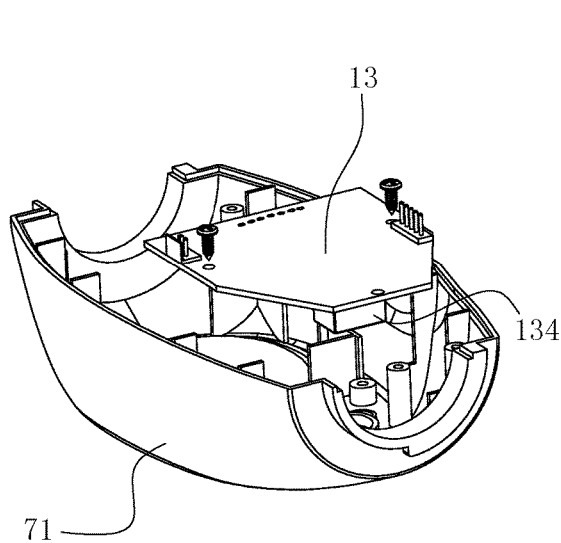
FIG. 4 is a perspective view of a front cover of the electrical box when a PCB circuit board is installed.
Figure 5:
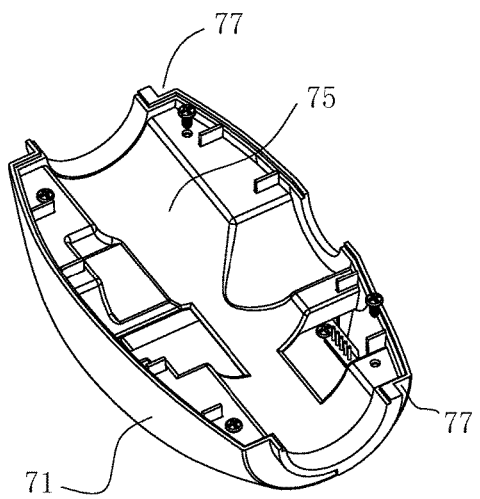
FIG. 5 is a perspective view of the front cover of the electrical box when an inner cover is disposed inside.
Figure 10:
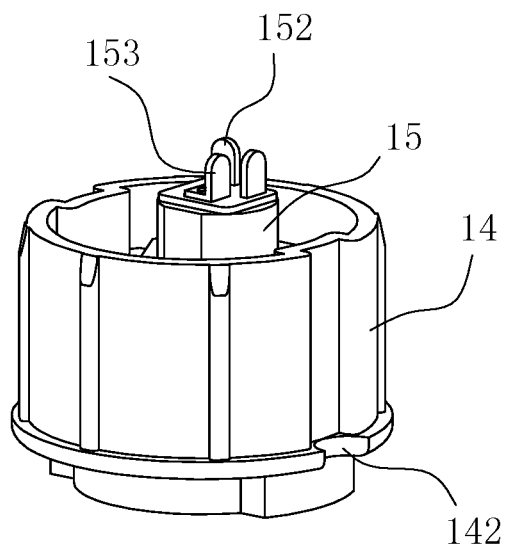
FIG. 10 is a perspective view after the cap plug and the DC socket are assembled.
Figure 11:
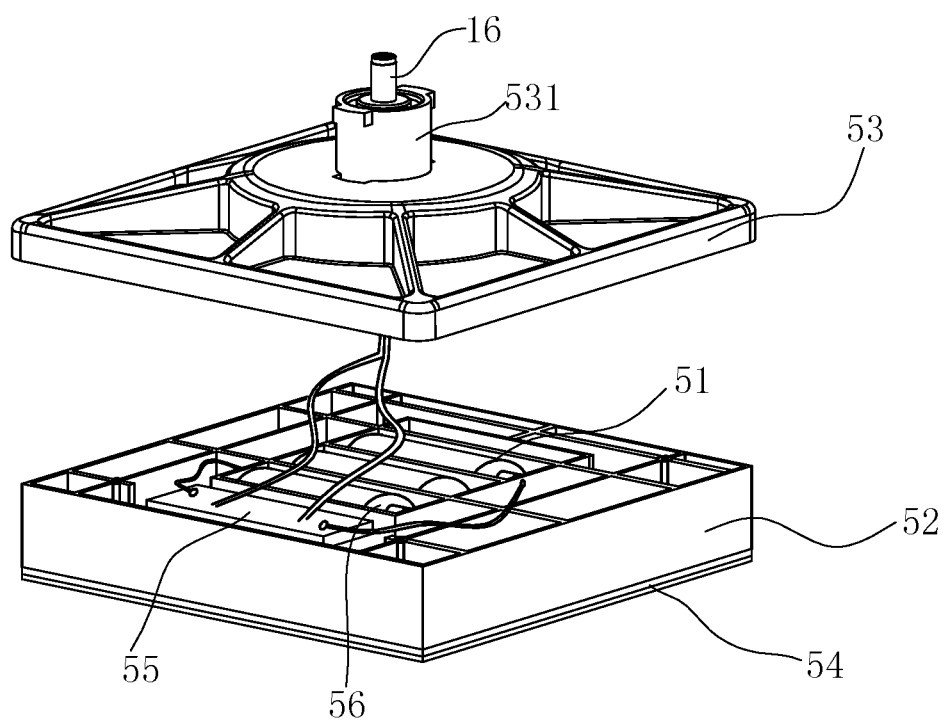
FIG. 11 is a perspective view of a DC plug and a solar receiving device.
Figure 12:
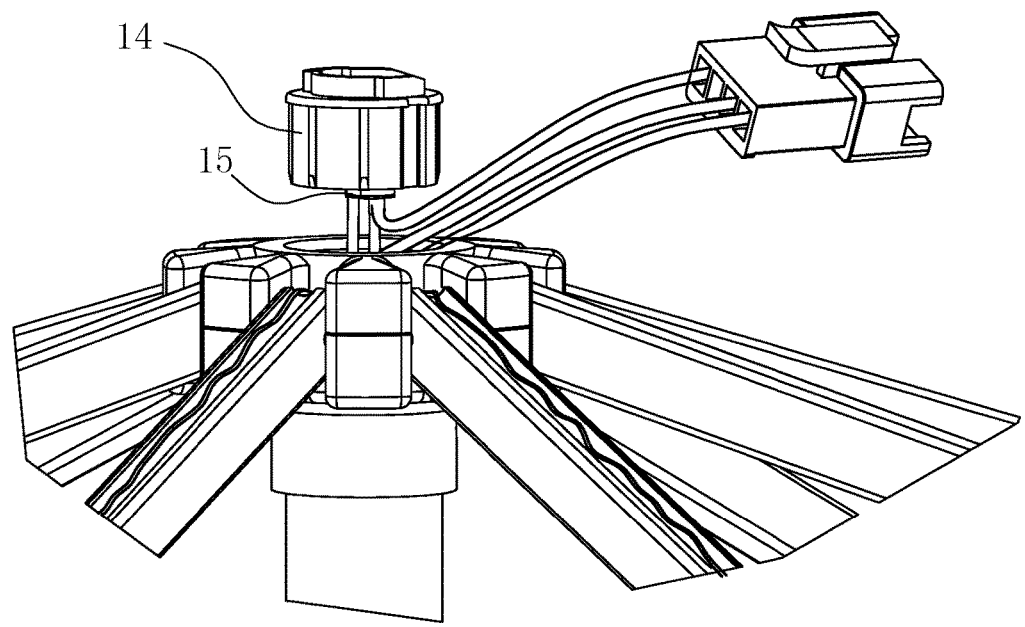
FIG. 12 is a perspective view of assembly and threading of the cap plug and column.
Figure 13:
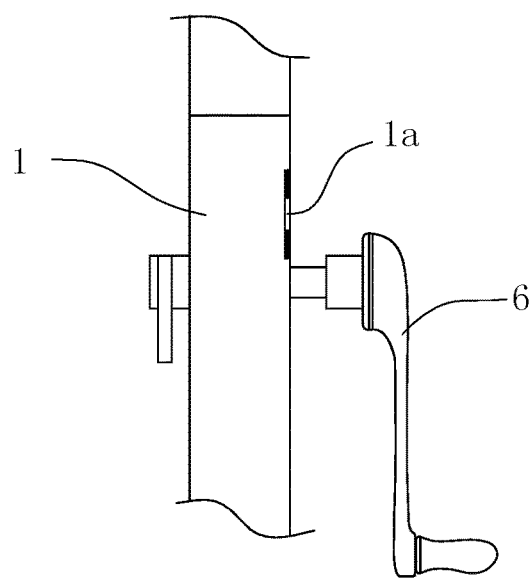
FIG. 13 is a perspective view of a wire pass hole on the column.
Figure 14:
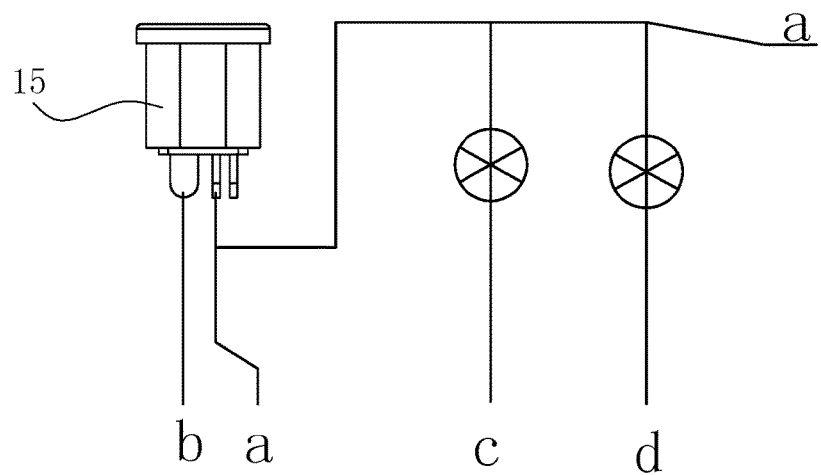
FIG. 14 is a wiring diagram of the DC socket.
Figure 15:
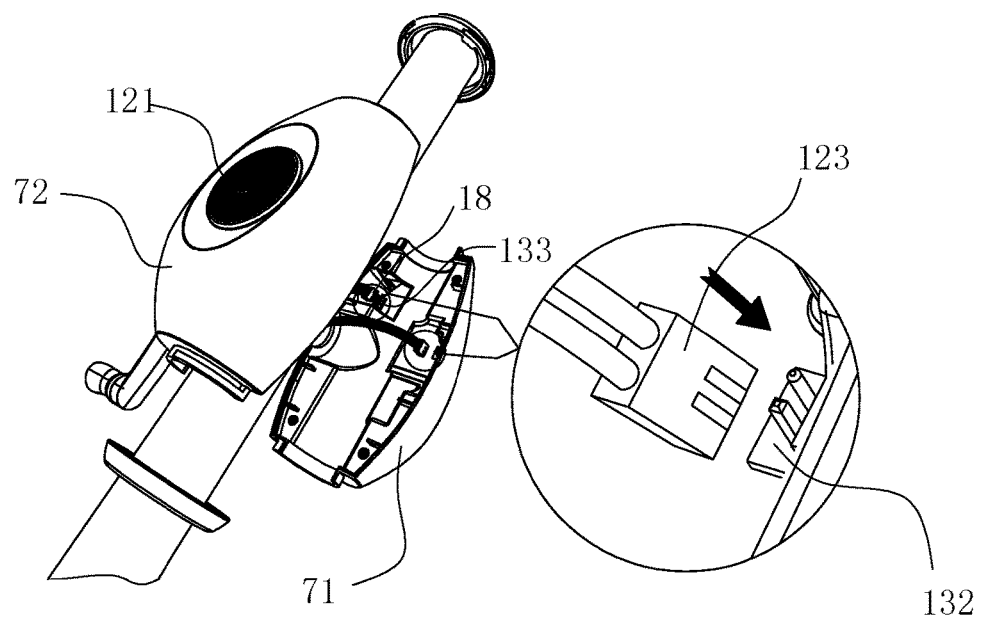
FIG. 15 is a schematic diagram of the assembly of the electrical box.
Figure 16:
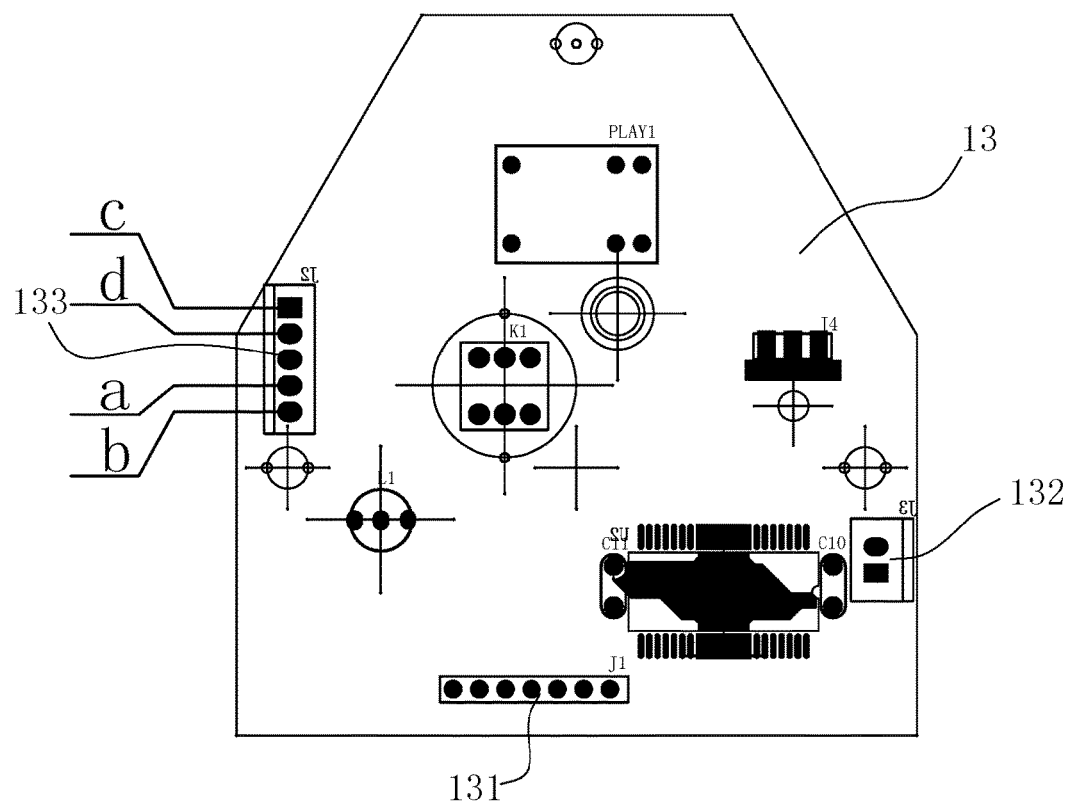
FIG. 16 is a structural schematic diagram of a PCB circuit board.

To enable a further understanding of the present invention content of the invention herein, refer to the detailed description of the invention and the accompanying drawings below:

As shown in FIG. 1-FIG. 18, an umbrella with a Bluetooth sound device of the present embodiment comprises a column 1 having a top and a middle, a tray 2, a plurality of ribs 4, a canopy 3, a controlling handle 6 and an electrical box 7 with an upper end and a lower end.

The plurality of ribs 4 are connected to the top of the column 1 through the tray 2, the canopy 3 covers the plurality of ribs 4, the electrical box 7 is attached to a position corresponding to the controlling handle 6 on the middle of the column 1, a solar receiving device 5 is connected to the top of the column 1, LED lamp strings 8 are attached to the tray 2 and the plurality of ribs 4, and the LED lamp strings 8 are usually embedded into locating grooves of the plurality of ribs 4 and an open slot of the tray 2.

The controlling handle 6 is disposed on the side of the electrical box 7 for operating the plurality of ribs 4 unfolded or folded, the structures and working principles of the controlling handle 6 for operating the plurality of ribs 4 unfolded or folded are traditional technical means and are not illustrated herein.

Figure 17:
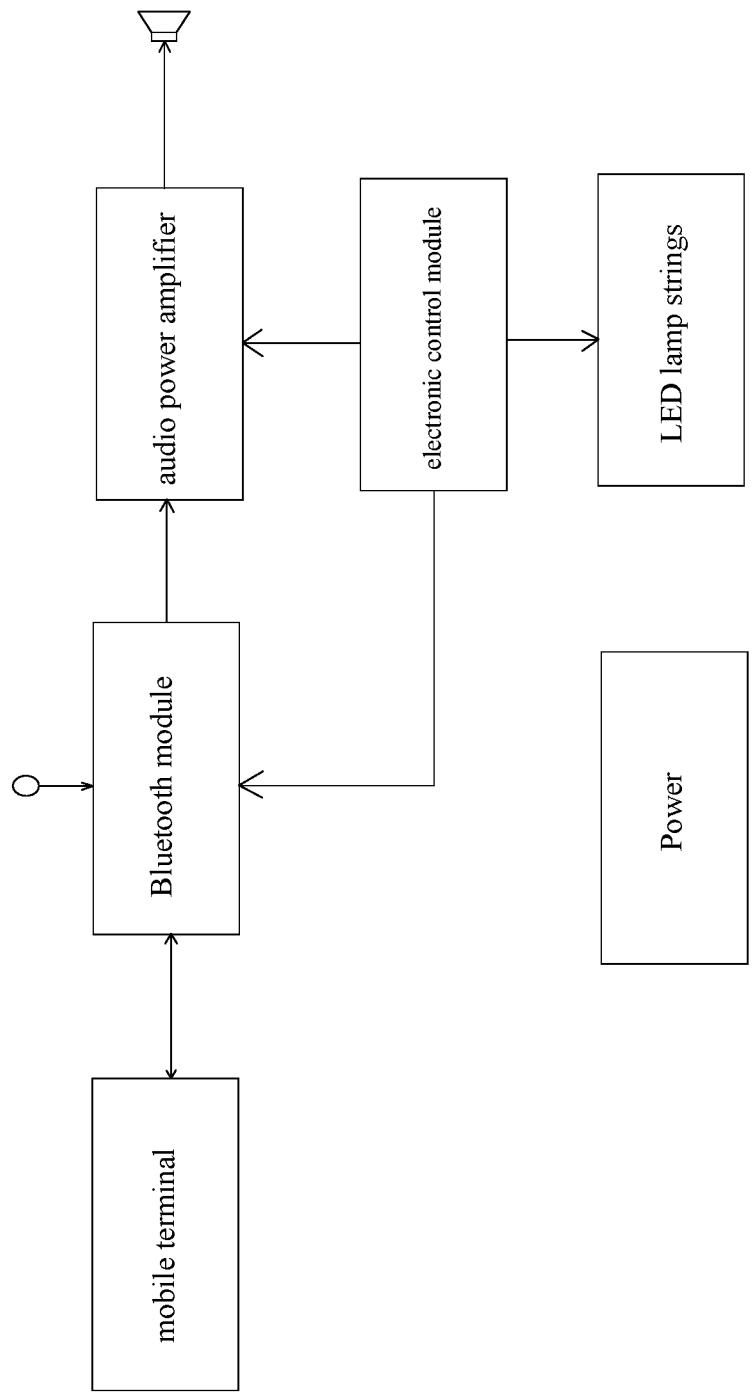
FIG. 17 is a circuit module diagram of the present invention.
Figure 18:
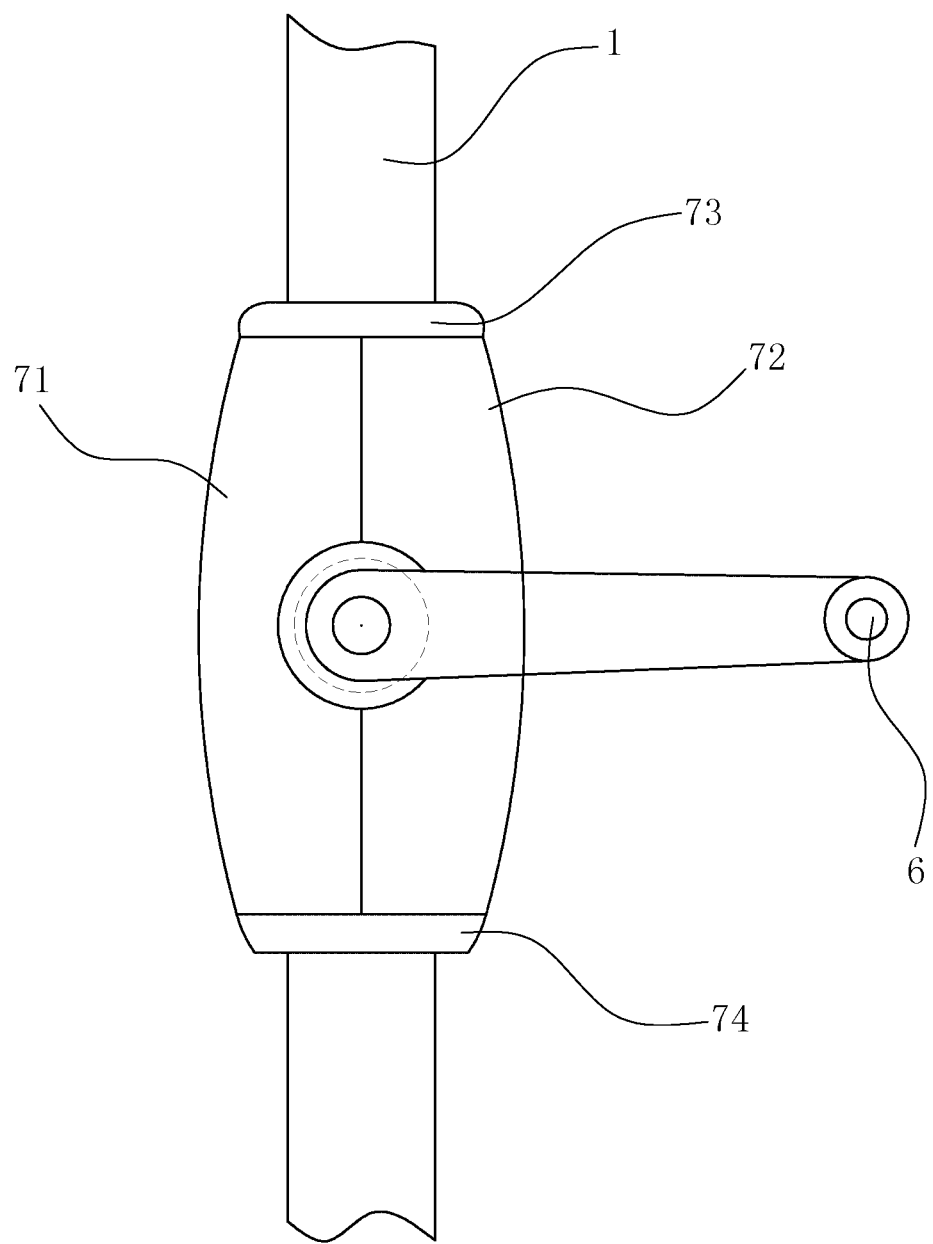
FIG. 18 is a side view of the electrical box.

The invention key lies in that an audio power amplifier, a speaker 12, an electronic control module, a Bluetooth module and a microphone circuit are disposed inside the electrical box 7; the Bluetooth module connects wirelessly with a mobile terminal for transmitting audio signals and answering calls of the mobile terminal; the audio power amplifier has an output connected to the speaker; the Bluetooth module has an output connected to an input of the audio power amplifier, the Bluetooth module is connected to the microphone circuit; and the electronic control module is connected to and controls the audio power amplifier, the Bluetooth module, and the LED lamp strings, and reference can be made to the schematic diagram FIG. 17.

The electrical box 7 comprises a front cover 71 having an inner cover 75 and a back cover 72 having an inner cover 76, the front cover 71 and the back cover 72 are involuted and snaps onto each other; fixing grooves 77 for sheathing an upper rotation snap ring 73 and a lower rotation snap ring 74 are respectively attached to the upper and lower ends of the electrical box 7; the electrical box 7 is connected and fixed by the upper rotation snap ring 73 and the lower rotation snap ring 74, is attached to the middle of the column 1 and is sheathed at the outside of the controlling handle 6 to expose the controlling handle 6.

Wherein an indicator lamp lampshade 9, a power switch 10 and a thin film switch 11 are disposed on an outer end surface of the front cover 71; the electronic control module with the Bluetooth module is disposed inside the front cover 71; the electronic control module is disposed on a PCB circuit board 13; a speaker 12 is detachably installed inside the back cover 72.

The specific installation structure is as follows: locating grooves 78, 79 for accommodating the indicator lamp lampshade 9 and the thin film switch 11 are formed in an outer surface of the front cover 71; the indicator lamp lampshade 9 is fixed to a corresponding position on the outer surface of the front cover 71 through screws; the power switch 10 is installed inside a switch hole of the indicator lamp lampshade 9; a switch spring propping against the power switch 10 is disposed inside the front cover 71; a spring seat 134 is disposed at a position corresponding to that of the power switch 10 on the PCB circuit board 13; the spring seat 134 is sheathed on the power switch 10 of the PCB circuit board 13; the PCB circuit board 13 is fixed to an inner side of the front cover 71 through screws.

The PCB circuit board 13 has a speaker interface 132 connected with the speaker 12, a connector interface 131 connected with the thin film switch 11 and a wires interface 133 (a lamp string interface) connected to the LED lamp strings 8, a solar rechargeable cell 5 and a negative electrode.

The thin film switch 11 comprises a lamp string on/off key, a Bluetooth switch, a volume increase key/continuous volume increase key, a last song key, a next song key and a volume decrease key/continuous volume decrease key; wherein the lamp string on/off key is in a four-segment mode, when the lamp string on/off key is pressed for once, a light control circuit is turned on, and the LED lamp strings 8 on the plurality of ribs 4 emit light; when the lamp string on/off key is pressed for twice, the LED lamp strings 8 on the tray 2 emit light; when the lamp string on/off key is pressed for three times, the LED lamp strings 8 on the plurality of ribs 4 and the LED lamp strings 8 on the tray 2 emit light at the same time; when the lamp string on/off key is pressed for four times, the LED lamp strings 8 on the plurality of ribs 4 and the LED lamp strings 8 on the tray 2 are turned off at the same time, thereby realizing the purpose that the light effects can be combined in the umbrella, this is realized by a traditional circuit, and reference can be made to the traditional technology; and the thin film switch 11 is adhered on a corresponding position on the outer surface of the front cover 71 by adhesive sticker, and key leads of the thin film switch 11 are connected with the connector interface 131 on the PCB circuit board 13 via through holes on the locating groove 78,79.

A speaker cover 121 for locating the speaker 12 is detachably disposed on the back cover 72; the speaker cover 121 is provided with a plurality of broadcasting holes; the speaker 12 is disposed inside the speaker cover 121; a speaker lead 122 is welded on the speaker 12; and an end of the speaker lead 122 is inserted into the speaker interface 132 on the PCB circuit board 13 through a lead plug 123.

The inner covers 75,76 of the front cover 71 and the back cover 72 are respectively fixed inside the front cover 71 and the back cover 72 through screws; a circular hole for penetrating through the column 1 is formed between the inner covers 75 and 76 after the involution of the front cover 71 and the back cover 72; the inner covers 75 and 76 protect the internal electric appliances; a notch for exposing the speaker interface 132 and the connector interface 131 on the PCB circuit board 13 and the wires interface 133 connecting the LED lamp strings 8, a solar rechargeable cell 51 and a negative electrode is formed in the inner cover 75 of the front cover 71; and a notch for penetrating through the speaker lead 122 is formed in the inner cover 76 of the back cover 72, therefore, the wiring and assembly are very convenient.

A cap plug 14 is inserted into the opening at the top end of the column 1; a DC socket 15 is inserted into the cap plug 14; a DC plug 16 inserted with the DC socket 15 is installed on the solar receiving device 5; a locating hole 141 for locating the solar receiving device 5 is formed in the cap plug 14; a center hole for inserting the DC socket 15 is formed in the locating hole 141; the DC socket 15 is inserted into the center hole by penetrating through the locating hole 141 and is fixed at the top of the column 1 by a fixing screw cap 17; two pins 152,153 are disposed on the lower end of the DC socket 15, the first pin 152 is connected with the negative electrode connecting wire a and the lamp string connecting wires c,d, and the second pin 153 is connected with the solar cell connecting wire b.

The lamp string connecting wires c,d comprise two paths for the rib lamp strings and the tray lamp strings in series and parallel; one of the two negative electrode connecting wires a is respectively connected with the lamp string connecting wires c and d; a first wire pass hole 142 for inserting the two paths of lamp string connecting wires c,d into the inner hole of the column 1 is formed in the side of the cap plug 14; a second wire pass hole 1a for enabling the ends of the negative electrode connecting wires a, the two lamp string connecting wires c,d and the solar cell connecting wire b to penetrate through is formed in a position corresponding to the installation position of the electrical box 7 on the side of the middle of the column 1; the ends of the negative electrode connecting wires a, the two lamp string connecting wires c,d and the solar cell connecting wire b are gathered on a total lead plug 18 after penetrating through the column 1 and are connected to the corresponding interface 133 on the PCB circuit board 13 in the electrical box 7 through the total lead plug 18.

The solar receiving device 5 comprises a solar photovoltaic cell panel 54, a solar rechargeable cell 51, a cell installation box and a cell circuit board 55; the solar rechargeable cell 51 is disposed inside the cell installation box, the solar rechargeable cell 51 is a nickel-metal hydride battery (or a lithium battery), red conducting wires of the solar photovoltaic cell panel 54 and the solar rechargeable cell 51 are respectively welded on a positive electrode bonding pad of the cell circuit board 55, while black conducting wires of the solar photovoltaic cell panel 54 and the solar rechargeable cell 51 are respectively welded on a negative electrode bonding pad of the cell circuit board 55; the cell installation box is composed of a box body 52 and a base 53, which are involutory; the solar photovoltaic cell panel 54 is disposed on the surface of the cell installation box; silica gel is coated on the surface of the installation box for fixing the solar photovoltaic cell panel 54; a charging circuit is formed through the cell circuit board 55 and the solar rechargeable cell 51; a locating block 531 matched with the locating hole 141 of the cap plug 14 for insertion is convexly disposed at the middle of the lower end of the base 53; an installation hole for inserting and fixing the DC plug 16 is formed inside the locating block 531; plastic cement is coated on the outer surface of the DC plug 16 to insert the DC plug 16 in the installation hole; the red conducting wire at the upper end of the DC plug 16 is welded on the positive electrode bonding pad of the cell circuit board 55, while the black conducting wire at the upper end of the DC plug 16 is welded on the negative electrode bonding pad of the cell circuit board 55; an accommodation groove 56 for accommodating the solar rechargeable cell 51 is formed inside the box body 52; a positive plate and a negative plate are respectively disposed on both ends of an inner wall of the accommodation groove 56; the solar receiving device 5 is disposed at the top of the column 1 through the collaboration between the locating block 531 and the locating hole 141 of the cap plug 14; and the lower end of the DC plug 16 is inserted with the DC socket 15 and is electrically connected with the same.

In the present invention, the Bluetooth muddle, the speaker 12, the LED lamp strings 8, the PCB circuit board 13, the solar receiving device 5 and the umbrella are reasonably combined and fused into an entirety, a Bluetooth muddle connection mode is provided for transmitting audio signals, the original sound is restored in the umbrella, a light source is generated in the umbrella by using an efficient LED light emitting diode, and thus an umbrella which can produce sound and emit light without external power supply is provided. In use, the Bluetooth switch on the front cover 71 is pressed, the Bluetooth of the mobile terminal is opened, the PCB circuit board 13 and the speaker 12 in the electrical box 7 are wirelessly connected by the Bluetooth to start working and playing music, and the purpose of selecting different songs in the mobile terminal is realized by pressing the last song key/the next song key. When a call is answered, the song playback is automatically stopped, and the call is answered. The purpose of combining light effects in the umbrella is realized by pressing the LED lamp string on/off key; of course, the Bluetooth function can also be canceled, the umbrella is used as a conventional illumination umbrella, the solar photovoltaic cell panel 54 makes the cell circuit board generate current when there is light at daytime so as to charge the solar rechargeable cell 51, and the solar rechargeable cell 51 discharges at night so as to realize the power supply purpose; and the connecting wires of the elements are inserted by the plugs and the wires interfaces, thereby being very convenient to assemble, convenient to detach and maintain, and safe and reliable to use and operate.

The invention claimed is:
1. An umbrella with a Bluetooth sound device, comprising:
  a column having a top, a top end, and a middle;
  a tray slidably mounted on the column;
  an opening on the top end of the column;

a plurality of ribs, which are connected to the top of the column through the tray;
a canopy covering the ribs;
a controlling handle disposed on the middle of the column for operating the plurality of ribs;
a solar receiving device connected to the top of the column;
a plurality of LED lamp strings attached to the tray and the ribs;
an electrical box, attached on the column, with an upper end and a lower end;
wherein, an audio power amplifier, a speaker, an electronic control module, a Bluetooth module and a microphone circuit are disposed inside the electrical box;
the Bluetooth module connecting wirelessly with a mobile terminal for transmitting audio signals and answering calls of the mobile terminal;
the audio power amplifier having an output connected to the speaker;
the Bluetooth module having an output connected to an input of the audio power amplifier, the Bluetooth module is connected to the microphone circuit;
the electronic control module is connected to and controls the audio power amplifier, the Bluetooth module, and the LED lamp strings;
a cap plug is inserted into the opening at the top end of the column;
a DC socket is inserted into the cap plug;
a DC plug inserted with the DC socket is installed on the solar receiving device;
an upper end of the DC socket is inserted into the DC plug, and a lower end of the DC socket is connected with lamp string connecting wires, solar cell connecting wire, and negative electrode connecting wire.

2. The umbrella of claim 1, wherein the electrical box comprises a front cover having an inner cover and a back cover having an inner cover, the front cover and the back cover are involuted and snaps onto each other;
an upper rotation snap ring and a lower rotation snap ring are respectively attached to the upper and lower ends of the electrical box;
the electrical box is attached to the middle of the column through the upper rotation snap ring and the lower rotation snap ring and is sheathed at the outside of the controlling handle.

3. The umbrella of claim 2, wherein an indicator lamp lampshade, a power switch and a thin film switch are disposed on an outer end surface of the front cover;
the electronic control module with the Bluetooth module is disposed inside the front cover;
the electronic control module is disposed on a PCB circuit board;
a speaker is installed inside the back cover;
the PCB circuit board has a speaker interface connected with the speaker, a connector interface connected with the thin film switch, a wires interface connected to lamp string connecting wires, a solar cell connecting wire and a negative electrode connecting wire;
two inner covers are respectively disposed inside the front cover and the back cover, and a circular hole for the column to pass through is formed between the inner covers after the front cover and the back cover snapped together.

4. The umbrella of claim 3, wherein locating grooves for accommodating the indicator lamp lampshade and the thin film switch are formed in an outer surface of the front cover;
the indicator lamp lampshade is fixed to a corresponding position on the outer surface of the front cover through screws;
the power switch is installed inside a switch hole of the indicator lamp lampshade;
a switch spring propping against the power switch is disposed inside the front cover;
the PCB circuit board is fixed to an inner side of the front cover through screws;
a spring seat is disposed at a position corresponding to that of the power switch on the PCB circuit board so as to support the switch spring.

5. The umbrella of claim 4, wherein the thin film switch comprises a lamp string on/off key, a Bluetooth switch, a volume increase key/continuous volume increase key, a last song key, a next song key and a volume decrease key/continuous volume decrease key;
the lamp string on/off key is in a four-segment mode, when the lamp string on/off key is pressed for once, a light control circuit is turned on, and the LED lamp strings on the plurality of ribs emit light;
when the lamp string on/off key is pressed for twice, the LED lamp strings on the tray emit light;
when the lamp string on/off key is pressed for three times, the LED lamp strings on the plurality of ribs and the LED lamp strings on the tray emit light at the same time;
when the lamp string on/off key is pressed for four times, the LED lamp strings on the plurality of ribs and the LED lamp strings are turned off at the same time;
the thin film switch is adhered on a corresponding position on the outer surface of the front cover by adhesive sticker;
key leads of the thin film switch are connected with the corresponding interfaces on the PCB circuit board via through holes on the locating grooves.

6. The umbrella of claim 5, wherein a speaker cover for locating the speaker is detachably disposed on the back cover;
the speaker is disposed inside the speaker cover;
a speaker lead is welded on the speaker;
an end of the speaker lead is inserted into the speaker interface on the PCB circuit board through a lead plug.

7. The umbrella of claim 6, wherein the inner covers of the front cover and the back cover are respectively fixed inside the front cover and the back cover through screws;
a notch for exposing the speaker interface on the PCB circuit board and the wires interface connecting the LED lamp strings, a solar rechargeable cell and a negative electrode is formed in the inner cover of the front cover;
a notch for penetrating through the speaker lead is formed in the inner cover of the back cover.

8. The umbrella of claim 1, wherein a locating hole for locating the solar receiving device is formed in the cap plug;
a center hole for inserting the DC socket is formed in the locating hole;
the DC socket is inserted into the center hole by penetrating through the locating hole and is fixed by a fixing screw cap;
a jack for inserting the DC plug is formed in the upper end of the DC socket;
two pins are disposed on the lower end of the DC socket, the first pin is connected with the negative electrode connecting wire and the lamp string connecting wires, and the second pin is connected with the solar cell connecting wire.

9. The umbrella of claim 8, wherein the lamp string connecting wires comprise two paths for the rib lamp strings and the tray lamp strings;
- a first wire pass hole for inserting the two paths of lamp string connecting wires into the inner hole of the column is formed in the side of the cap plug;
- a second wire pass hole for enabling the ends of the negative electrode connecting wire, the two paths of lamp string connecting wires and the solar cell connecting wire to penetrate through is formed in a position corresponding to the installation position of the electrical box on the side of the middle of the column;
- the ends of the negative electrode connecting wire, the two paths of lamp string connecting wires and the solar cell connecting wire are gathered on a total lead plug after penetrating through the column and are connected to the corresponding wires interface on the PCB circuit board in the electrical box through the total lead plug.

10. The umbrella of claim 8, wherein the solar receiving device comprises a solar photovoltaic cell panel, a solar rechargeable cell, a cell installation box and a cell circuit board;
- the solar rechargeable cell is disposed inside the cell installation box, red conducting wires of the solar photovoltaic cell panel and the solar rechargeable cell are respectively welded on a positive electrode bonding pad of the cell circuit board, while black conducting wires of the solar photovoltaic cell panel and the solar rechargeable cell are respectively welded on a negative electrode bonding pad of the cell circuit board;
- the cell installation box is composed of a box body and a base, which are involutory;
- the solar photovoltaic cell panel is disposed on the surface of the cell installation box;
- a charging circuit is formed through the cell circuit board and the solar rechargeable cell;
- a locating block matched with the locating hole of the cap plug for insertion is convexly disposed at the middle of the lower end of the base;
- an installation hole for inserting and fixing the DC plug is formed inside the locating block;
- the DC plug is disposed inside the installation hole;
- the red conducting wire at the upper end of the DC plug is welded on the positive electrode bonding pad of the cell circuit board, while the black conducting wire at the upper end of the DC plug is welded on the negative electrode bonding pad of the cell circuit board.

11. The umbrella of claim 10, wherein an accommodation groove for accommodating the solar rechargeable cell is formed inside the cell installation box;
- a positive plate and a negative plate are respectively disposed on both ends of an inner wall of the accommodation groove;
- plastic cement is coated on the outer surface of the DC plug;
- the upper end of the DC plug is inserted into the installation hole, and the lower end of the DC plug is inserted with the DC socket through the collaboration between the locating block and the locating hole.

* * * * *